United States Patent [19]

Pickenhagen

[11] 4,337,277
[45] Jun. 29, 1982

[54] FLAVORING WITH 7-METHYL-OCT-3-EN-2-ONE

[75] Inventor: Wilhelm Pickenhagen, Chavannes-des-Bois, Switzerland

[73] Assignee: Firmenich SA, Geneva, Switzerland

[21] Appl. No.: 253,844

[22] PCT Filed: Aug. 8, 1980

[86] PCT No.: PCT/CH80/00097
§ 371 Date: May 18, 1981
§ 102(e) Date: Apr. 22, 1981

[87] PCT Pub. No.: WO81/00802
PCT Pub. Date: Apr. 2, 1981

[30] Foreign Application Priority Data

Sep. 18, 1979 [CH] Switzerland .................. 8409/79

[51] Int. Cl.$^3$ ............................................. A23L 1/226
[52] U.S. Cl. ................................. 426/534; 568/383; 568/391; A23L/1/231
[58] Field of Search ......................................... 426/534

[56] References Cited

U.S. PATENT DOCUMENTS

| 3,654,309 | 4/1972 | Thomas et al. | 426/534 X |
| 3,904,780 | 9/1975 | Yamamoto et al. | 426/534 |
| 4,234,518 | 11/1980 | Yoshida et al. | 426/534 X |
| 4,283,433 | 8/1981 | Pickenhagen | 426/534 |

OTHER PUBLICATIONS

Furia et al., Fenaroli's Handbook of Flavor Ingredients, 2nd Ed., 1975 CRC Press: Cleveland, p. 446.
Van Straten et al., Volatile Compounds in Foods, 4th Ed., 1977, Central Inst. for Nutrition and Fd. Res., Netherlands, pp. 73.3, 75.2, 93.1, 98.1.

*Primary Examiner*—Joseph M. Golian
*Attorney, Agent, or Firm*—Pennie & Edmonds

[57] ABSTRACT

Process for the aromatization of various foodstuffs or beverages by means of 7-methyl-oct-3-en-2-one and foodstuffs, beverages or flavoring compositions containing this latter as organoleptically active ingredient. 7-Methyl-oct-3-en-2-one enables namely to develop a gustative note of fatty, oily, green type which is characteristic of foodstuffs subjected to frying.

4 Claims, No Drawings

FLAVORING WITH 7-METHYL-OCT-3-EN-2-ONE

TECHNICAL FIELD

The invention relates to the field of flavors, more particularly to the use of an unsaturated aliphatic ketone, 7-methyl-oct-3-en-2-one, as flavoring ingredient.

STATE OF THE ART

It is particularly noteworthy to observe that among the numerous unsaturated ketone derivatives appreciated in the art for their gustative properties, unsaturated aliphatic aldehydes represent the most frequently encountered class. Dec-2-enal for instance is used for the reconstitution of flavors of fruity type, mainly citrous fruits or peach type, as well as hex-2-enal, under its trans isomeric form, which more particularly is used in strawberry, banana, apple or apricot type compositions.

Among α-substituted α,β-unsaturated aldehydes, one may cite for example 2-butyl-but-2-enal, the aroma of which is defined as sweet, roasted and fatty, and is reminiscent of that of hazel-nuts. Finally, certain β,γ-or γ,δ-unsaturated aldehydes, such as hept-4-enal, are used in the reconstitution of gustative notes of creamy and fatty type.

On the contrary, none of the corresponding homologous ketones has raised a similar interest in the field of flavors in spite of the fact that their synthesis or their stability does not present more problems than in the case of the aldehydes. Only exception, 2-methyl-hept-2-en-6-one, which is used in trace amounts in flavors of fruity type such as apple, banana, citrous fruits, blackcurrant or raspberry type flavors - see to this effect S. Arctander, Perfume and Flavor Chemicals, N.J. 1969; section 2043-.

Contrary to what the cited state of the art could imply, it has been found that 7-methyl-oct-3-en-2-one possessed interesting organoleptic properties and consequently it could be used advantageously as flavoring ingredient for the aromatization of foodstuffs or beverages for example.

DISCLOSURE OF THE INVENTION

The object of the invention is a process designed to reinforce, improve or modify the organoleptic properties of foodstuffs or beverages characterized in that 7-methyl-oct-3-en-2-one is added thereto in a quantity sufficient to be effective.

The object of the invention consists also in a flavoring composition, as well as a foodstuff or a beverage containing 7-methyl-oct-3-en-2-one as organoleptically active ingredient. Finally, the object of the invention consists also in a process destined to confer, reinforce or improve the gustative note of green-oily type of foodstuffs subjected to frying, characterized in that 7-methyl-oct-3-en-2-one is added thereto in a quantity sufficient to be effective, as well as in a foodstuff subjected or destined to frying to which 7-methyl-oct-3-en-2-one is added as flavoring ingredient.

Best mode to carry out the invention

7-Methyl-oct-3-en-2-one is characterized by a gustative note of fatty, oily, green, earthy, nut type, reminiscent more precisely of the taste of french fries, peanuts, pork and bacon. It finds consequently a particularly advantageous utilization in the aromatization of foodstuffs subjected or destined to frying, wherein it reinforces efficiently the characteristic oily-green type note of foodstuffs subjected to frying.

More generally, 7-methyl-oct-3-en-2-one enables to develop, reinforce or improve notes of fatty, oily, meat, nut or peanut type in extremely various foodstuffs, for example in meat or meat-imitating foodstuffs destined to human or animal consumption.

Moreover, 7-methyl-oct-3-en-2-one finds an unexpected utilization for the aromatization of oleagineous products, more particularly of vegetable oils, wherein it develops a gustative note of green type characteristic of olive oil. The quantities of 7-methyl-oct-3-en-2-one to be used to achieve flavoring effects such as those described above, are the most frequently in between about 0.1 to 10 ppm (parts per million) based on the weight of the flavored substance. 7-Methyl-oct-3-en-2-one is preferably used at about 0.5 to 5 ppm, though concentrations higher or lower than the above given limits could also be used, namely for the manufacture of flavoring compositions. It is however in the realm of the man of the art to discover by himself the most proper quantities in relation to the desired effects, namely as a function of the nature of the product to be flavored or of that of the coingredients of a given composition.

7-Methyl-oct-3-en-2-one can be incorporated as such in the foodstuffs of beverages to be flavored, or also as a mixture with other flavoring ingredients, consequently under the form of a flavoring composition, preferably in solution in an edible solvent such as ethanol, dipropylene-glycol or triacetine for example. 7-Methyl-oct-3-en-2-one is a known product: it can be obtained for example from 4-methyl-pentanal and 2-oxo-propyl-triphenylphosphonium chloride as indicated in J. Org. Chem. 37,776 (1972). It can be obtained also by cleavage of the corresponding Schiff base, according to the Wittig type directed aldolization - see for example "Neuere Methoden der präparativen organischen Chemie", Vol. VI, p. 56-57, W. Forst Verlag-.

Details of this preparation are given hereinbelow:

(a) 100 ml of a 1.62 N solution of butyl-lithium in hexane were added to 14.3 g of di-isopropylamine in solution in 72 ml of absolute ether. After having cooled the above mixture to 0° C., a solution of 19.8 g of N-propylidene-cyclohexylamine in 115 ml of absolute ether was added thereto (addition in ca 15 min), followed by 14.3 g of 4-methyl-pentanal at −70° C.

After the mixture had been left under stirring while allowed to reach room temperature, it was poured onto ice and finally extracted with ether. After evaporation of the volatile parts, there were collected 34 g of residue.

(b) This was heated during 2 h 30 at reflux in the presence of 136 ml of 10% $H_2SO_4$ in water to give after ether extraction, successive washings until neutralization and concentration, 17 g of raw residue. By distillation on a FISCHER type column, 14 g of the desired product were finally isolated, b.p. 73°-77° C./10 Torr.

The product obtained was characterized as follows:
NMR: signals at 0.82, 0.89, 1.33-1.75, 1.93, 2.13-3.11 and 5.47 δppm MS: m/e=125(16); 97(44); 82(28); 71(28); 55(90); 43(100).

According to analysis, 7-methyl-oct-3-en-2-one thus prepared occurred under the form of a cis-trans 30:70 isomeric mixture. As much as all isomeric mixtures obtained according to the chosen synthetic pathway, this mixture is perfectly adapted to the working of the present invention.

Possibilities of industrial application

EXAMPLE 1

The aromatization of a salt aqueous solution (0.5% NaCl in water) was carried out by means of 1 ppm (part per million) of 7-methyl-oct-3-en-2-one. The consulted team of experts expressed their view as follows: taste of french-fries, peanuts, more particularly of peanuts skin, meat broth, type pork, fat, bacon.

EXAMPLE 2

The aromatization of a relatively bland tasting commercial soja oil was carried out by means of 5 ppm of 7-methyl-oct-3-en-2-one. By comparison with a non-aromatized oil sample (control), the aromatized product was defined as greener, more fruity-nut than the control sample; the overall aroma perceived was reminiscent moreover of that of olive oil.

EXAMPLE 3

A sample of commercial peanut butter was flavored by means of 3 ppm of 7-methyl-oct-3-en-2-one. By comparison with a sample of non-flavored peanut butter, the aromatized product was described as possessing a more pronounced peanut character, more particularly concerning the green, earthy and roasted note typical of peanut.

EXAMPLE 4

A sample of relatively bland tasting hydrogenated vegetable oil was flavored by means of 10 ppm of 7-methyl-oct-3-en-2-one.

Samples of an extruded product consisting of 75% of maize and 25% of dehydrated potatoes were then coated with the flavored oil as indicated hereinafter (parts by weight):

| Ingredients | Sample A | B[1] |
| --- | --- | --- |
| Extruded product | 80 | 80 |
| Flavored oil | 20 | — |
| Non-flavored oil | — | 20 |
| Total | 100 | 100 |

[1]control sample

After having carried out an organoleptic evaluation, the consulted team of experts declared as follows: the flavored product possessed an overall aroma of oily, fried type more pronounced than that of the control sample; more marked note of fried potatoes, nut and peanut type.

I claim:

1. A process for reinforcing, improving or modifying the organoleptic properties of foodstuffs or beverages comprising adding thereto from about 0.1 to 10 ppm based on the weight of said foodstuff or beverage of substantially pure 7-methyl-oct-3-en-2-one.

2. A composition comprising a foodstuff or a beverage and from about 0.1 to 10 ppm based on the weight of said foodstuff or beverage of substantially pure 7-methyl-oct-3-en-2-one as a flavoring ingredient.

3. A process for imparting, reinforcing or improving the oily-green gustative note of foodstuffs subjected to a frying process comprising adding thereto from about 0.1 to 10 ppm based on the weight of said foodstuffs of substantially pure 7-methyl-oct-3-en-2-one.

4. A foodstuff to be subjected to a frying process having added thereto a flavoring ingredient comprising substantially pure 7-methyl-oct-3-en-2-one in an amount of about 0.1 to 10 ppm based on the weight of said foodstuff.

* * * * *